(No Model.) 2 Sheets—Sheet 2.
R. M. HUNTER.
ELECTRIC MOTOR AND DYNAMO ELECTRIC MACHINE.
No. 500,132. Patented June 27, 1893.
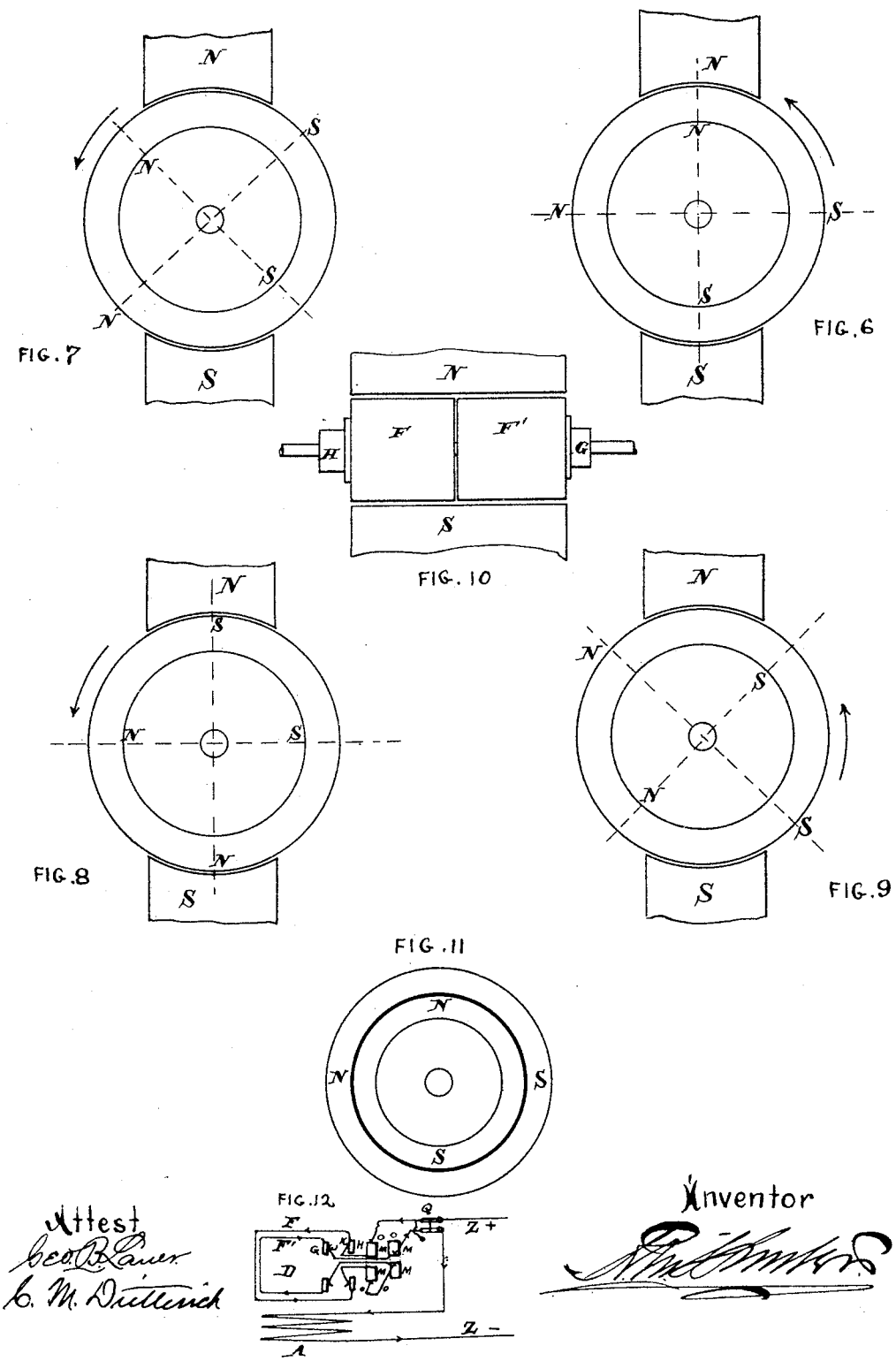

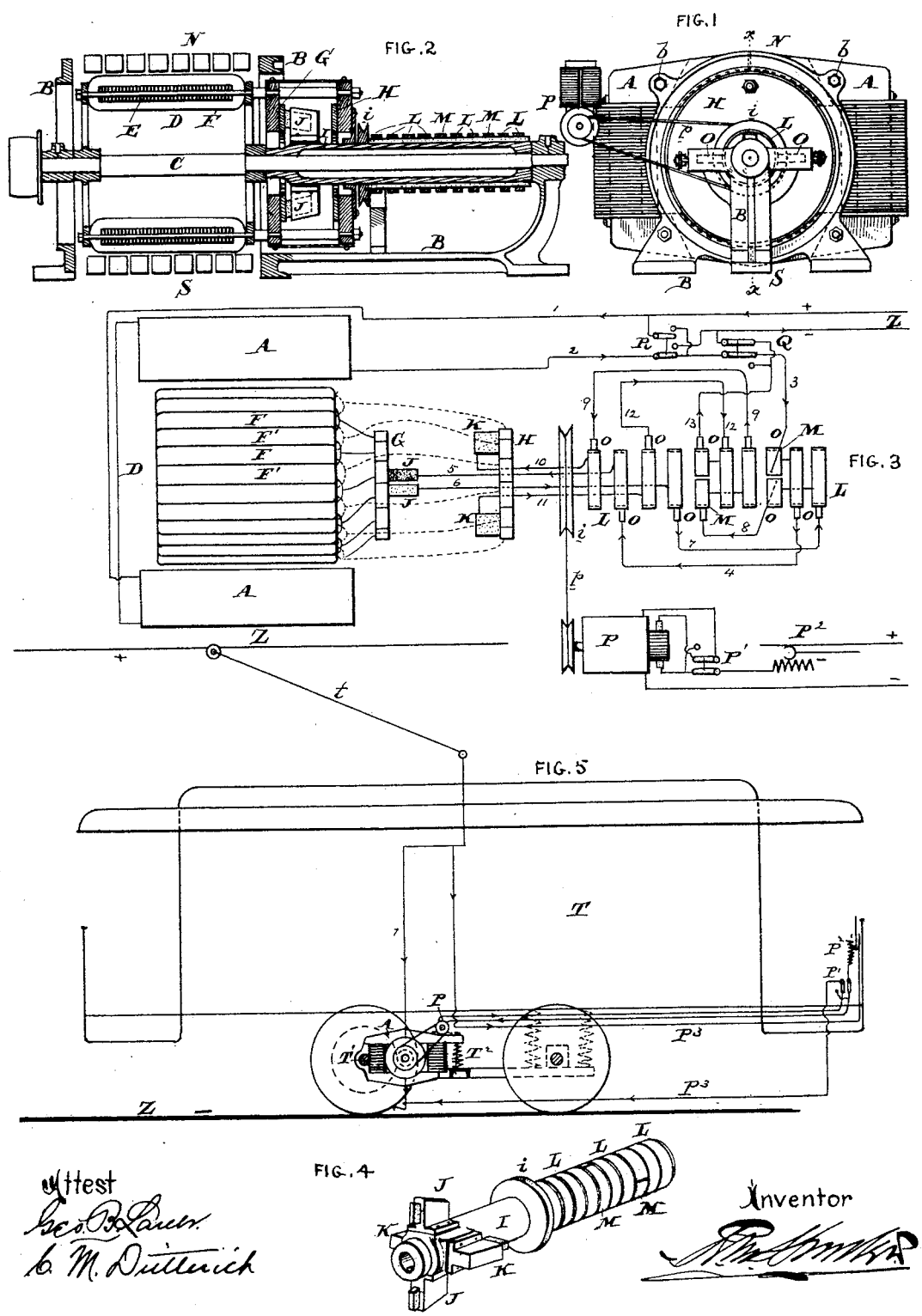

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC MOTOR AND DYNAMO-ELECTRIC MACHINE.

SPECIFICATION forming part of Letters Patent No. 500,132, dated June 27, 1893.

Application filed October 4, 1892. Serial No. 447,789. (No model.)

*To all whom it may concern:*

Be it known that I, RUDOLPH M. HUNTER, of the city and county of Philadelphia, State of Pennsylvania, have invented an Improvement in Electric Motors and Dynamo-Electric Machines, of which the following is a specification.

My invention has reference to electric motors and dynamo electric machines, and consists of certain improvements which are fully set forth in the following specification and shown in the accompanying drawings which form a part thereof.

This application, Case No. 228, has special reference to the construction and operation of electric motors or dynamos, designed to operate at variable or slow speeds. The invention has especial value with respect to electric motors in that it permits the regulation of the largest motors with small consumption of current such as would be required for motors of very small size. In other words, a motor having a capacity of one thousand to two thousand horse power might be regulated by my improvements with a loss of current such as would be the case with a motor of say one half to one horse power. With this improvement, it is immaterial what capacity the main motor has or at what speed or amount of the work it may be doing. The loss due to regulation should never exceed that corresponding to about a half to one horse power motor.

When my invention is applied to dynamo electric machines, it has the advantage of permitting the generator to be run at a slow speed with all the advantages of a high speed dynamo. This is particularly advantageous in large machines and where the armature shaft is directly coupled to the power shaft or prime mover.

In carrying out my invention, I provide a permanent field for creating an intense field of force in which the armature revolves very much in the ordinary way. The armature is constructed with two sets of coils and two commutators but revolving as a unit in the field of force. Brushes are arranged for the respective commutators and are adapted to be rotated independently of the armature shaft, and so arranged that there may be two north and two south poles in the armature. These parts are connected in circuit so that the field magnets may be in series or in parallel with the armature coils as preferred. The brushes are rotated by a single independent motor, or may be rotated by gearing connecting directly with the armature shaft. In this latter case however, there would be no possibility of variable regulation, and therefore, it is desirable that as a rule an independent motor shall be employed to control rotation of the brushes. When the motor is at rest the brushes are being revolved at their greatest speed, and as the motor increases its speed the brushes may gradually be slowed down, so that the counter electro motive force generated in the motor may have that relation to the initial electric motive force of the line that will insure only the proper flow of current to perform the work required. The action of the revolving brushes is to produce a counter electro motive force whose voltage shall be independent of the speed of the motor or the current in the line beyond the mere necessary relation between the magnetic conditions of the motor which necessarily bear a certain relation to each other.

In the case of operating the machine as a dynamo, the necessary electro motive force may be produced irrespective of the speed by the proper relation of the brushes. The difficulties arising with a dynamo is not one relating to varying speed as that is designed to become constant, but relates more to the output of the machine in watts.

The machine is especially useful on high potential circuits carrying constant current since the potential may be varied to suit the resistance of the line by the small variation in the speed of the brushes. By properly winding, the special parts the machine may be operated as a compound or shunt machine, and be used upon constant potential circuits giving a varying current, without varying the speed of the prime mover which may continue at its slow velocity.

My invention will be better understood by reference to the accompanying drawings, in which—

Figure 1 is a side elevation of an electric motor or dynamo embodying my invention.

Fig. 2 is a sectional elevation of same on line x—x. Fig. 3 is a diagram illustrating the various circuits and relations between the parts of the dynamo or motor. Fig. 4 is a perspective view of the brushes, their holders and commutator rings. Fig. 5 is a diagrammatic elevation illustrating my invention applied to an electric car. Figs. 6 to 9 are diagrams illustrating polarities in the field and armature through a portion of a revolution of the armature. Fig. 10 is a plan view illustrating a modified arrangement of the armature. Fig. 11 is an end view illustrating a still further modification of the armature, and Fig. 12 is a diagram similar to Fig. 3 showing the use of less contact rings on the brush holder.

A are the field magnets and are made of horse shoe sections bolted to brackets B at the ends by bolts $b$. By this construction the field magnets are laminated to a certain extent and reduce to some extent the defects due to Foucault currents and also obviate the necessity of any joints between the north and south poles.

C is the armature shaft, and D is the armature which may be constructed in any suitable manner, the construction shown being the well known Gramme type, though the winding may be of the drum armature type if so desired.

E represents the core of the armature, and upon this is wound a series of coils F F' alternately, and those coils are coupled to two independent commutators G and H which revolve with the armature shaft. The coils F' and commutator G are independent of the coils F and commutator H except so far as they may be connected in the same circuit through the brushes.

I is the brush holder and is loosely sleeved upon the armature shaft C, and is provided with four sockets suitably insulated for the brushes J J of the commutator G and K K of the commutator H, the said brushes having such relation with their commutators that the north and south poles of the coils F do not coincide with the north and south poles of the coils F', but are preferably at right angles thereto. This difference of the poles may vary, but in practice it is preferable that they should be separated at an angle corresponding to ninety degrees. The field magnets are wound with coils in the usual way adapted to maintain an intense field.

N represents the north poles and S the south poles of the various figures when speaking of the field or the armature.

The brush holder is provided with a band wheel $i$ which is rotated by a band $p$ leading to an electric motor P of a suitable construction, and of just sufficient capacity to properly revolve the brushes. In practice, it might be only a thousandth part of the capacity of the large motor which it regulates. This small motor is controlled by a rheostat $P^2$ and may be reversed by a reversing switch P'. The brush holder has also secured upon it a series of rings L, M shown in Figs. 2, 3, and 4; more rings are shown than are really necessary in practice but are indicated for more readily following the circuits. In reality the commutator rings M M are the only ones required as the sections of these rings might be connected directly with the brushes without the intervention in the rings L.

Referring to Fig. 3, the arrows indicate the flow of the current. The current comes from the line wire Z, passes through wire 1, and after circulating through the field magnets A, A, the current passes as follows:—through wire 2, then 3 to ring M, thence by ring L to wire 4, to another ring L, wire 5 to brush J of commutator G, and after circulating the coils F' of the armature, it returns by brush J, wire 6 to ring L, by wire 7 to another ring L, thence to one commutator M, thence to ring L, thence by wire 9 to another ring L, and by wire 10 to brush K of commutator H, and after circulating the coils F of the armature, the current returns by brush K, wire 11, ring L, by wire 12 to a second ring L, thence to commutator M, and by wire 13 back to line Z.

A reversing switch Q may be employed for reversing the current in the armature for reversing the motor. A switch R shown in Fig. 3 may be employed for putting the field magnet coils in shunt relation with respect to the armature coils, or the machine may be shunt wound and permanently remaining so without deviating from the principle of my invention.

For traction work, practice has shown that series motors are the only satisfactory motors on account of the enormous variation of the load as well as the speed. For stationary work, however, shunt wound motors are excellently adapted, and with them my invention may be used with good effect. The brushes of the brush holder are guided in oblique guides which have the effect of keeping the ends of the brushes in contact with the commutators by action of centrifugal force due to the action of revolving the brushes, but it is quite evident that any suitable mechanical construction may be employed in lieu thereof, and this would be essential in case the commutator sections were made like a drum in place of a disk.

O represents the various brushes used upon the rings L and M.

In Fig. 12 I have shown a diagram illustrating the same general arrangement of parts as in Fig. 3; but it will be observed that all of the rings upon the brush holder excepting the commutator rings M are dispensed with.

Referring to the diagrams in Figs. 6 to 9, the north and south poles in the armature are so shown that they are always operating when the brushes are revolving to rotate the armature shaft except at the instant of passing the fixed poles.

When the brushes are stationary it is preferable that they should be set so as to make the poles what is indicated in Figs. 7 or 9; this will give the maximum torque with a given current. The power of the motor may be materially decreased by adjusting the brushes so as to make the poles as indicated in Figs. 6 and 8. When the brushes are revolving these poles in the armature are constantly shifting, and whenever a pole in the armature passes one of the fixed poles of the field, the ring M commutates the current so as to reverse that polarity to make the torque continue in the same direction. At no time is the resistance of the armature cut out of the circuit, but that resistance may vary somewhat. It is very easy to modify this variation in the resistance altogether, and by some additions not here shown, it is possible to maintain the resistance of the armature practically at all times.

It will be observed that in this improvement the polarities of the armature are reversed as they pass the stationary or fixed poles of the field magnets, and this is accomplished by providing means for reversing the current in the coils on the moving armature at the time the revolving brushes are passing the poles of the stationary field magnets. It is quite evident that by bringing the terminals of the winding of the coils of the armature in advance or to the rear of their coils the commutator segment corresponding to said coils would be correspondingly in advance or to the rear, and consequently the brushes, strictly speaking, would not be passing the fixed poles of the field magnets when the current was reversed in them, but the poles of the armature would be reversed when passing the fixed poles by the reversal of the current in the revolving brushes.

In the place of employing a single core for the two sets of armature coils, there may be two cores, each of which may be fully covered with coils as shown in Fig. 11, or as shown in Fig. 10. In the case of Fig. 11 there would be more wire on the armature, and the power of the machine would be greater than in the case shown in Figs. 1, 2, and 3. In the construction shown in Fig. 10, to obtain the capacity of the construction shown in Fig. 11, it would be essential to make the field magnets of greater length, or to increase the diameter of the machine very materially.

In Fig. 5 I have shown the motor as hinged to one of the axles D' of the car, and flexibly supported at its free end at T² upon a frame carried by the axle independently of the car body T which is supported upon the springs in the usual manner. The line circuits are represented at Z and correspond to the positive or suspended conductor, and the negative or rail return. $t$ is the current collecting device such as a trolley. The current passes from the trolley through the large motor and to the rails, and the speed and power of the motor is controlled by the small motor P arranged in shunt relation with the large motor and having a small rheostat P² and reversing switch P' to be operated from the front platform of the car. The main motor is geared to the axle to which it is hinged in any of the well known ways or as it is possible to run the motor at any desirable speed with full efficiency, this armature shaft may be directly connected with the axle.

It will be observed that there is no varying of the line resistance or of the motor circuit for controlling the large motor, but the entire regulation is produced by generating in the armature coils under their own influence, and the influence in the stationary field magnets, counter electro motive force of sufficient potential to overcome the initial electro motive force to any degree required to insure only the requisite current flowing through the motor.

A motor of this kind may be also employed with great advantage as a brake, for by revolving the brushes in the reverse direction with great rapidity, the counter electro motive forces may be made to greatly exceed the initial electric motive force of the line, thus acting as a dynamo and performing the dual result of slowing down the car and delivering current into the line. This action can be produced even with the car at rest, so that it is not necessary that the car be descending a grade, or running at a very great velocity to produce this excellent braking operation.

The field magnets may be permanent magnets with or without the use of coils, though the latter are desirable. The metal when coils are used, may be iron or steel as preferred. By employing permanent or stationary field magnets A, A, my machine is always in condition to act as a generator without the use of exciting coils and an independent source of current. The machine may be started up in a manner similar to any ordinary dynamo, and may have its electro motive force increased or decreased, or raised to any desired potential and maintained there, as desired, with any ordinary speed prime mover. In this manner the greatest production of current may be maintained with the least expenditure of power, a feature which is of great importance in large central work.

While I prefer the construction shown I do not limit myself to the details, as they may be modified in various ways without departing from the principles of my invention.

Having now described my invention, what I claim as new, and desire to secure by Letters Patent, is—

1. In an electric motor or dynamo, the combination of field magnets having fixed poles, a rotary armature having two sets of coils and two commutators, revolving brushes for said commutators, and means to supply current to said brushes to maintain the armature poles relatively the same with respect to the fixed poles.

2. In an electric motor or dynamo, the combination of field magnets having fixed poles, a rotary armature having two sets of coils and two commutators, revolving brushes for said commutators, and means to supply current to said brushes consisting of two commutating rings having their sections connected with respective brushes and receiving current from the line whereby the current is reversed in the brushes during the revolution of the brushes.

3. In an electric motor or dynamo, the combination of field magnets having fixed poles, a rotary armature having two sets of coils and two commutators, revolving brushes for said commutators, means to supply current to said brushes, means to reverse the current in the revolving brushes when the poles of the armature are passing the fixed poles, and connecting circuits for coupling the coils of the field magnets in series with both sets of coils of the armature.

4. In an electric motor or dynamo, the combination of field magnets having fixed poles, a rotary armature having two sets of coils and two commutators, revolving brushes for said commutators, means to supply current to said brushes, means to reverse the current in the revolving brushes when the poles of the armature are passing the fixed poles, connecting circuits for coupling the coils of the field magnets in series with both sets of coils of the armature, and a hand operated reversing switch for reversing the current in the connecting circuits leading to the armature coils independently of the field magnets.

5. In an electric motor or dynamo, the combination of field magnets having fixed poles, a rotary armature having two sets of coils and two commutators, revolving brushes for said commutators, means to supply current to said brushes, current reversing devices for reversing the current in said brushes when the poles of the armature are passing the fixed poles, and power devices having controlling mechanism for revolving the brushes at variable speeds.

6. In an electric motor or dynamo, the combination of field magnets having fixed poles, a rotary armature having two sets of coils and two commutators, revolving brushes for said commutators, means to supply current to said brushes, current reversing devices for reversing the current in said brushes when the poles of the armature are passing the fixed poles, and power devices having controlling mechanism for revolving the brushes at variable speeds consisting of an electric motor provided with a rheostat or current controlling device independent of the main motor.

7. In an electric motor or dynamo, the combination of field magnets having fixed poles, a rotary armature having two sets of coils and two commutators, revolving brushes for said commutators, means to supply current to said brushes, current reversing devices for reversing the current in said brushes when the poles of the armature are passing the fixed poles, power devices having controlling mechanism for revolving the brushes at variable speeds consisting of an electric motor provided with a rheostat or current controlling device independent of the main motor, and a hand reversing switch for reversing the direction of rotation of the regulating motor.

8. In an electric motor or dynamo, the combination of stationary field magnets, with a revolving armature having two sets of coils arranged alternately, two commutators each having one half as many sections as there are total coils upon the armature, electric connections between the sections of the two commutators and the coils of the armature so that alternate coils are connected to the same commutator, independent brushes for the said commutators, and means to revolve the brushes, and reverse the current independently in the two sets of armature coils when the armature poles are passing the fixed poles of the stationary field magnets.

9. In an electric motor or dynamo, the combination of stationary field magnets, with revolving armature having two sets of coils arranged alternately, two commutators each having one half as many sections as there are total coils upon the armature, electric connections between the sections of the two commutators and the coils of the armature so that alternate coils are connected to the same commutator, independent brushes for the said commutator, means to revolve the brushes, and reverse the current in the two sets of armature coils successively when the armature poles are passing the fixed poles of the stationary field magnets and a reversing switch to reverse the current in the armature independently of the field.

10. In an electric motor or dynamo, the combination of stationary field magnets, an armature revolving therein having two sets of coils each of which are evenly distributed throughout the entire circumference of the armature, two commutators one for each of said sets of coils, independent brushes for said commutators arranged to produce poles in their corresponding coils which shall be at an angle to each other, connecting circuits between the coils of the field magnets and coils of the armature, and a reversing switch for reversing the current in the coils of the armature independently of the field coils.

11. In an electric motor or dynamo, the combination of the stationary field magnets, with an armature having two sets of coils arranged to produce consequent poles due to the production of direct poles formed by each set of coils of the armature and in which the direct poles of one set of coils are at an angle to the direct poles of the other set of armature coils, a commutator for each of the sets of armature coils, and brushes for the respective commutators for supplying current thereto.

12. In an electric motor or dynamo, the combination of the stationary field magnets, with an armature having two sets of coils and two commutators located at one end of the said armature, brushes for the respective commutators, means for revolving the brushes, and reversing the current in the two sets of armature coils successively when the armature poles are passing the fixed poles of the stationary field magnets and connecting circuits whereby the circuits of the armature are maintained in connection with an external circuit during the revolution of the brushes.

13. The combination of a vehicle on wheels, an electric motor having stationary or fixed field magnets supported upon the axle and having an armature adapted to rotate one of the axles, a stationary source of electric supply, line conductors extending along the railway for supplying current to the motor, and means to generate a counter electro motive force in the armature independently of the field magnets for controlling the current passing through the field magnets.

14. The combination of an electric car, an electric motor having fixed field magnets and a revolving armature provided with two sets of coils and commutators, revolving brushes for said commutators whereby the poles of the armature may be made to travel at a speed greater or less than that of the armature shaft, current reversing devices for reversing the current in the armature coils when the poles of the armature are passing the poles of the fixed field magnets, circuits connecting with a source of electric supply and maintaining the armature in series with the field magnet coils, power devices for revolving the brushes, and means upon the car for controlling the power devices to vary the speed of revolution of the brushes.

15. In an electric motor or dynamo, the combination of stationary field magnets having fixed poles, with an armature to rotate and provided with two independent sets of coils each set of coils being adapted to produce a north and a south pole and in which the poles produced by one set of coils are at angles to those produced by the other set of coils, electric circuits for supplying current to the field magnets and armature coils, means to maintain the armature poles relatively the same with respect to the fixed poles during the rotation of the armature.

16. In an electric motor or dynamo, the combination of stationary field magnets having fixed poles, with an armature to rotate and provided with two independent sets of coils each set of coils being adapted to produce a north and a south pole and in which the poles produced by one set of coils are at angles to those produced by the other set of coils, separate commutators for each set of armature coils, independent brushes for each commutator, means to move the brushes about the commutators, means to maintain the armature poles relatively the same with respect to the fixed poles of the stationary field magnets during the rotation of the armature, and electric circuits for supplying current to the field magnets and armature coils.

In testimony of which invention I have hereunto set my hand.

R. M. HUNTER.

Witnesses:
ERNEST HOWARD HUNTER,
HELEN L. MOTHERWELL.